US010761351B2

(12) United States Patent
Lee et al.

(10) Patent No.: US 10,761,351 B2
(45) Date of Patent: Sep. 1, 2020

(54) PHASE MODULATION ACTIVE DEVICE, METHOD OF DRIVING THE SAME, AND OPTICAL APPARATUS INCLUDING THE PHASE MODULATION ACTIVE DEVICE

(71) Applicant: SAMSUNG ELECTRONICS CO., LTD., Suwon-si (KR)

(72) Inventors: Duhyun Lee, Yongin-si (KR); Changgyun Shin, Anyang-si (KR); Sunil Kim, Osan-si (KR); Byounglyong Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 485 days.

(21) Appl. No.: 15/685,314

(22) Filed: Aug. 24, 2017

(65) Prior Publication Data
US 2018/0059444 A1    Mar. 1, 2018

(30) Foreign Application Priority Data

Aug. 24, 2016   (KR) .................. 10-2016-0107777

(51) Int. Cl.
*G02F 1/00*   (2006.01)
*G02F 1/01*   (2006.01)
(Continued)

(52) U.S. Cl.
CPC ............ *G02F 1/0126* (2013.01); *G01S 17/06* (2013.01); *G02F 1/0121* (2013.01); *G02F 1/292* (2013.01); *G02F 2203/50* (2013.01)

(58) Field of Classification Search
USPC ...................................... 356/4.01
See application file for complete search history.

(56) References Cited

U.S. PATENT DOCUMENTS 5,093,747 A    3/1992  Dorschner
7,457,547 B2*  11/2008 Frisken .............. G01M 11/0292
                                                    398/119
(Continued)

FOREIGN PATENT DOCUMENTS

JP         3461911 B2    10/2003
JP         3723062 B2    12/2005
JP       2012-108346 A    6/2012

OTHER PUBLICATIONS

P. Shames et al., "Modeling and optimization of electro-optic phase modulator", Proceedings Optical Diagnostics of Living Cells II, vol. 2693, (1996) (10 Pages Total).

(Continued)

*Primary Examiner* — James R Hulka
(74) *Attorney, Agent, or Firm* — Sughrue Mion, PLLC

(57) ABSTRACT

A phase modulation active device and a method of driving the same are provided. The method may include configuring, for the phase modulation active device including a plurality of channels that modulate a phase of incident light, a phase profile indicating a phase modulation target value to be implemented by the phase modulation active device; setting a phase limit value of the phase modulation active device; generating a modified phase profile based on the phase profile by modifying the phase modulation target value, for at least one channel from the plurality of channels that meets or exceeds the phase limit value, to a modified phase modulation target value that is less than the phase limit value in the phase profile; and operating the phase modulation active device based on the modified phase profile. Thus, improved optical modulation performance may be achieved.

28 Claims, 10 Drawing Sheets

(51) Int. Cl.
*G02F 1/29* (2006.01)
*G01S 17/06* (2006.01)

(56) References Cited

U.S. PATENT DOCUMENTS

| | | | |
|---|---|---|---|
| 8,437,634 B2 | 5/2013 | Sakurai | |
| 9,124,373 B2* | 9/2015 | Aflatouni | H04B 10/2504 |
| 9,546,902 B2* | 1/2017 | Kovacich | G01J 3/027 |
| 9,632,216 B2* | 4/2017 | Han | G02B 5/008 |
| 2006/0098156 A1 | 5/2006 | Frisken et al. | |
| 2012/0033069 A1* | 2/2012 | Becker | G01S 17/89 |
| | | | 348/135 |
| 2012/0128355 A1* | 5/2012 | Sakurai | G02B 6/356 |
| | | | 398/48 |
| 2013/0322892 A1 | 12/2013 | Aflatouni et al. | |
| 2015/0241562 A1* | 8/2015 | Goldberg | G01S 17/42 |
| | | | 356/3.11 |
| 2015/0268095 A1* | 9/2015 | Kovacich | G01N 21/274 |
| | | | 356/437 |
| 2016/0223723 A1 | 8/2016 | Han et al. | |

OTHER PUBLICATIONS

L. Zhuang et al., "Phased Array Receive Antenna Steering System Using a Ring Resonator-Based Optical Beam Forming Network and Filter-Based Optical SSB-SC Modulation", Microwave Photonics, 2007 IEEE International Topical Meeting on, (2007) (pp. 88-91).

Ibrahim Murat Soganci et al., "Monolithically Integrated InP 1 x 16 Optical Switch With Wavelength-Insensitive Operation", IEEE Photonics Technology Letters, vol. 22, No. 3, (2010) (p. 143-145).

Communication dated Jan. 17, 2018, from the European Patent Office in counterpart European Application No. 17186689.0.

Engstrom et al., "Fast beam steering with a ferroelectric-liquid-crystal optical phased array", Applied Optics, Mar. 20, 2009, vol. 48, No. 9, Optical Society of America, pp. 1721-1726.

\* cited by examiner

PHASE MODULATION ACTIVE DEVICE, METHOD OF DRIVING THE SAME, AND OPTICAL APPARATUS INCLUDING THE PHASE MODULATION ACTIVE DEVICE

CROSS-REFERENCE TO RELATED APPLICATION

This application claims priority from Korean Patent Application No. 10-2016-0107777, filed on Aug. 24, 2016 in the Korean Intellectual Property Office, the disclosure of which is incorporated herein in its entirety by reference.

BACKGROUND

1. Field

The present disclosure relates to a phase modulation active device, a method of driving the same, and an optical apparatus including the phase modulation active device.

2. Description of the Related Art

An optical device for changing transmission/reflection, polarization, phase, strength, path, etc., of incident light is used in various optical apparatuses. To control the aforementioned characteristics in a desired manner in an optical system, optical modulators having various structures have been suggested.

For example, liquid crystal having optical anisotropy, a microelectromechanical system (MEMS) structure using fine mechanical movement of a light blocking/reflecting element, and so forth have been widely used for general optical modulators. These optical modulators have a slow operation response time of several microseconds or more due to characteristics of a manner of operation thereof.

Recently, there has been an attempt to apply a meta structure to an optical modulator. The meta structure is a structure in which a value smaller than a wavelength of incident light is applied to a thickness, a pattern, or a period. By combining phase modulation types with respect to incident light, optical modulation may be implemented in various forms and various optical characteristics may be achieved with high response speed, and may be favorably applied to ultra-micro devices.

SUMMARY

The present disclosure provides a phase modulation active device, which is capable of implementing desired optical capabilities by combining phase modulation types, and a method of driving the phase modulation active device.

Additional aspects will be set forth in part in the description which follows and, in part, will be apparent from the description, or may be learned by practice of the presented example embodiments.

According to an aspect of an example embodiment, a method of driving a phase modulation active device may include configuring, for the phase modulation active device including a plurality of channels that modulate a phase of incident light, a phase profile indicating a phase modulation target value to be implemented by the phase modulation active device; setting a phase limit value of the phase modulation active device; generating a modified phase profile based on the phase profile by modifying the phase modulation target value, for at least one channel from the plurality of channels that meets or exceeds the phase limit value, to a modified phase modulation target value that is less than the phase limit value in the phase profile; and driving the phase modulation active device based on the modified phase profile.

The setting the phase limit value may include obtaining a correlation between a phase modulation value of one of the plurality of channels and a voltage applied to the phase modulation active device; and, based on the correlation, setting a value at which a phase change is saturated as the phase limit value.

The setting the phase limit value may further include setting a minimum value and a maximum value of phase modulation to be implemented by the phase modulation active device based on the correlation.

The maximum value may be less than or equal to the phase limit value and may be greater than 90% of the phase limit value.

The modifying the phase modulation target value may include modifying the phase modulation target value, for the at least one channel of the plurality of channels that meets or exceeds the phase limit value, to the minimum value.

The modifying the phase modulation target value may include modifying a first phase modulation target value, for a first portion of channels from the plurality of channels that meet or exceed the phase limit value, to the maximum value, and modifying a second phase modulation target value, for a second portion of the channels from the plurality of channels that meet or exceed the phase limit value, to the minimum value.

The second phase modulation target value for the second portion of channels may be set to the minimum value when the second phase modulation target value is higher than a predetermined threshold value.

The setting the phase limit value may further include setting voltage values $V_0$ and $V_m$ to be applied to the phase modulation active device, the voltage values $V_0$ and $V_m$ corresponding to the minimum value and the maximum value, respectively.

The driving the phase modulation active device may include applying the voltage value $V_m$ to a first portion of channels from the plurality of channels that meet or exceed the phase limit value, and applying the voltage value $V_0$ to a second portion of the channels that meet or exceed the phase limit value.

According to an aspect of an example embodiment, there is provided a phase modulation active device that may include a phase modulator including a plurality of channels, each channel of the plurality of channels configured to modulate a phase of incident light independently from other channels of the plurality of channels, a signal input unit configured to apply a first input signal for phase modulation to the each channel of the plurality of channels; a signal input unit configured to apply a first input signal for phase modulation to the each channel of the plurality of channels; and a controller configured to control the signal input unit to apply the first input signal, which implements a phase modulation value less than a target phase modulation value of a channel, to at least one channel among the plurality of channels that exhibits a phase limit.

The phase modulation value less than the target phase modulation value may be a minimum value among phase modulation values that are implemented by the phase modulator based on the first input signal.

A phase limit value may be less than 330°.

A second input signal, which implements a maximum value among the phase modulation values that are implemented by the phase modulator based on the second input signal, may be applied to at least one other channel among the plurality of channels that exhibits the phase limit.

The second input signal that implements the maximum value is applied to a first portion of channels that exhibit the phase limit, and the first input signal that implements the minimum value may be applied to a second portion of the channels that exhibit the phase limit.

The first input signal may be applied to second portion of the channels having target phase values that exceed a predetermined threshold value.

The phase modulator may be configured to modulate the phase of the incident light according to an applied voltage, and from among the channels that exhibit the phase limit, a first voltage value implementing the minimum value may be applied to the second portion of the channels having target phase values exceeding a predetermined threshold value, and a second voltage value implementing the maximum value may be applied to the first portion of the channels.

The phase modulator may include an active layer having optical characteristics that change with an electric signal, a nano array layer including a plurality of nano structures arranged over the active layer, and an electrode layer configured to apply a signal to the active layer.

Each nano structure of the plurality of nano structures may have a shape dimension that is smaller than a wavelength of the incident light.

Each nano structure of the plurality of nano structures may include a metallic material.

The phase modulator may further include an insulating layer disposed between the nano array layer and the active layer.

The signal input unit may be configured to apply a voltage between each nano structure of the plurality of nano structures and the electrode layer.

Each nano structure of the plurality of nano structures may include a dielectric material.

The phase modulator may further include a conductive layer disposed between the nano array layer and the active layer. The signal input unit may be further configured to apply a voltage between the conductive layer and the electrode layer.

The signal input unit may be further configured to cause the phase modulator to perform at least one of beam steering, focusing, defocusing, beam shaping, or beam splitting.

According to another aspect of the present disclosure, there is provided an optical device including the phase modulation active device described above.

According to an aspect of an example embodiment, there is provided a lidar device that may include a light source unit, a phase modulation active device and a sensor unit. The phase modulation active device may be configured to steer light from the light source unit toward an object. The phase modulation active device may include a phase modulator including a plurality of channels, each channel of the plurality of channels configured to modulate a phase of incident light independently from other channels of the plurality of channels; a signal input unit configured to apply an input signal for phase modulation to the each channel of the plurality of channels; and a controller configured to control the signal input unit to apply the input signal, which implements a phase modulation value less than a target phase modulation value of a channel, to at least one channel among the plurality of channels that exhibits phase limit. The sensor unit may be configured to receive the light that is steered by the phase modulation active device, irradiated to the object, and reflected from the object.

The controller may be further configured to control the signal input unit to sequentially adjust a steering direction of the phase modulation active device to scan the object.

BRIEF DESCRIPTION OF THE DRAWINGS

These and/or other aspects will become apparent and more readily appreciated from the following description of the example embodiments, taken in conjunction with the accompanying drawings in which.

DETAILED DESCRIPTION

Figure 1:
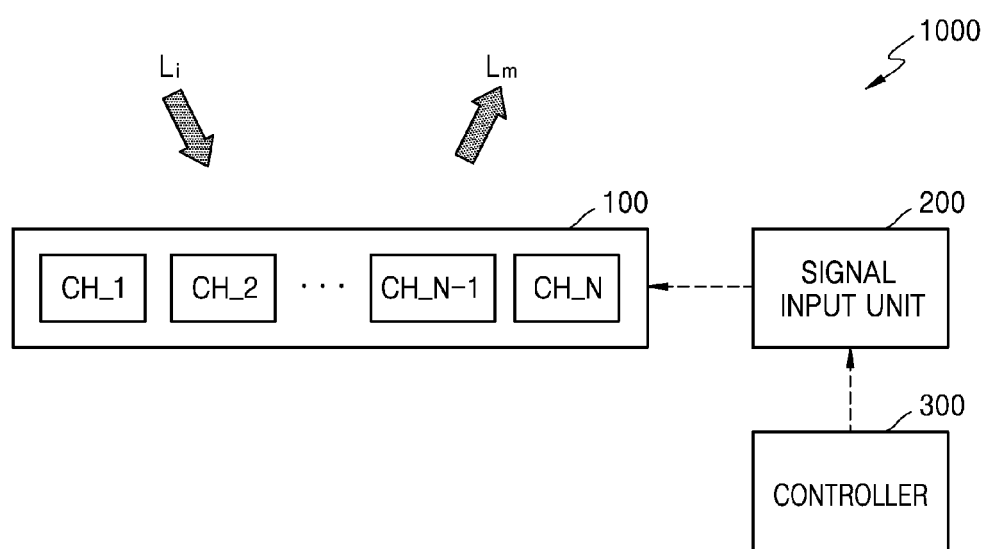
FIG. 1 is a block diagram schematically illustrating a structure of a phase modulation active device according to an example embodiment.

Reference will now be made in detail to example embodiments, which are illustrated in the accompanying drawings, wherein like reference numerals refer to like elements throughout. In this regard, the present example embodiments may have different forms and should not be construed as being limited to the descriptions set forth herein. Accordingly, the example embodiments are described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, example embodiments of the present disclosure will be described in detail with reference to the accompanying drawings. Throughout the drawings, like reference numerals refer to like elements, and each element may be exaggerated in size for clarity and convenience of a description. Meanwhile, the following example embodiments are merely illustrative, and various modifications may be possible from the example embodiments.

An expression such as "above" or "on" may include not only the meaning of "immediately on and in contact with," but also the meaning of "on without making contact."

The singular forms are intended to include the plural forms as well, and vice versa, unless the context clearly indicates otherwise. If it is assumed that a certain part includes a certain component, the term 'including' means that a corresponding component may further include other components unless a specific meaning opposed to the corresponding component is written.

The use of "the" and other demonstratives similar thereto may correspond to both a singular form and a plural form.

Unless the order of operations of a method is explicitly mentioned or described otherwise, the operations may be performed in any order. The order of the operations is not limited to the order the operations are mentioned. The use of all examples or exemplary terms (e.g., "etc.," "and (or) the like," and "and so forth") is merely intended to described technical aspects in detail, and the scope is not necessarily limited by the examples or exemplary terms unless defined by the claims.

Figure 2:
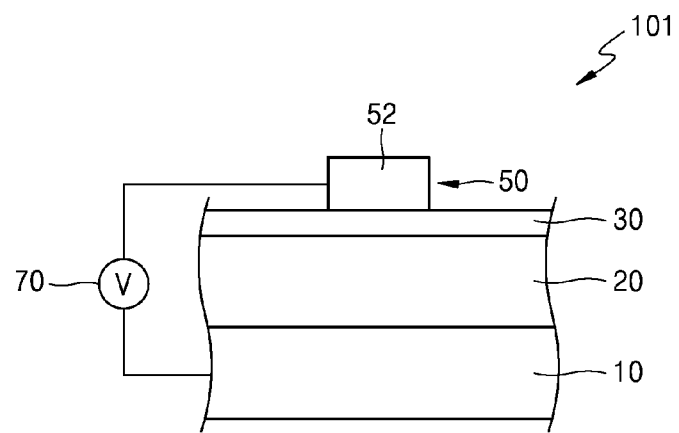
FIG. 2 is a cross-sectional view illustrating an exemplary structure of a phase modulator adoptable in the phase modulation active device illustrated in FIG. 1.
Figure 3:
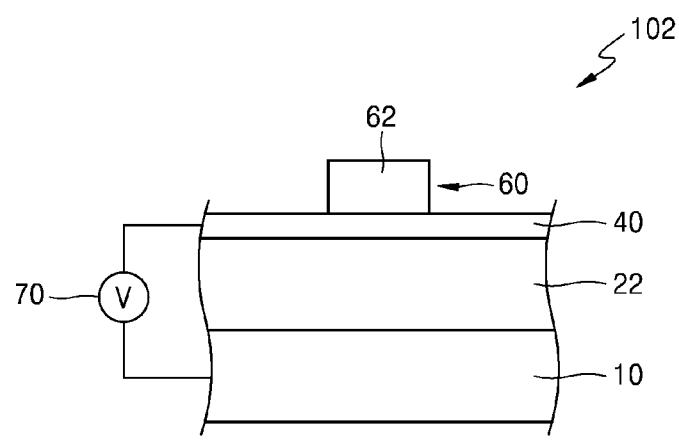
FIG. 3 is a cross-sectional view illustrating another exemplary structure of a phase modulator adoptable in the phase modulation active device illustrated in FIG. 1.

FIG. 1 is a block diagram schematically illustrating a structure of a phase modulation active device 1000 according to an example embodiment. FIGS. 2 and 3 illustrate a detailed structure of phase modulators 101 and 102, respectively, which are adoptable in the phase modulation active device 1000.

The phase modulation active device 1000 may include a phase modulator 100 including a plurality of channels CH_1 through CH_N for modulating a phase of incident light, a signal input unit 200 for applying an input signal (e.g., control signal) for phase modulation to each of the plurality of channels CH_1 through CH_N, and a controller 300 for controlling the signal input unit 200.

The phase modulator 100 may include the plurality of channels CH_1 through CH_N to independently modulate a phase of incident light $L_i$. The phase modulator 100 may include an active layer having optical properties that change with an applied signal and a plurality of nano structures arranged adjacent to or over the active layer, wherein each of the plurality of nano structures may form the plurality of channels CH_1 through CH_N. A detailed exemplary structure of the phase modulator 100 may be described with reference to FIGS. 2 and 3. Each of the plurality of channels CH_1 through CH_N may modulate a phase of the incident light $L_i$ according to a signal applied thereto from the signal input unit 200. The input signal from the signal input unit 200 may be determined according to a detailed structure of the phase modulator 100, e.g., materials of the active layer and the nano structure adopted in the phase modulator 100. If the phase modulator 100 adopts a material having optical properties that change with an electric signal, the signal input unit 200 may be configured to apply an electric signal, e.g., a voltage signal, to the phase modulator 100. By appropriately controlling regularity for modulating a phase in each of the plurality of channels CH_1 through CH_N of the phase modulator 100, the incident light $L_i$ may be output as modulated light $L_m$ in various forms, and the phase modulator 100 may perform, for example, beam steering, focusing, defocusing, beam shaping, beam splitting, or the like, with respect to the incident light $L_i$.

The controller 300 may control the signal input unit 200 such that each of the plurality of channels CH_1 through CH_N is independently suitably controlled with respect to a wavelength of the incident light $L_i$ to be modulated and a desired modulation type. The controller 300 may include circuitry that generates and/or adjust an electric signal. For example, the controller 300 may be a processor, a central processing unit (CPU), a system-on-chip (SoC), an application-specific integrated circuit (ASIC), etc. The phase modulation active device 1000 may also include computer-readable storage device (e.g., volatile or non-volatile memory) for storing instructions which, when executed by the controller 300, cause the controller 300 to perform various operations as disclosed herein, e.g., control the input signal emitting from the signal input unit 200.

FIGS. 2 and 3 illustrate a detailed structure of the phase modulators 101 and 102 adoptable in the phase modulation active device 1000. In other words, either one or both of the phase modulators 101 and 102 may be used in the phase modulation active device 1000 as one or more channels of the phase modulator 100.

Referring to FIG. 2, the phase modulator 101 may include an active layer 20, a nano array layer 50 in which a conductive nano structure 52 is arrayed, and an electrode layer 10 for applying a signal to the active layer 20. The active layer 20 may include a material having optical properties that change with signal application. The active layer 20 may include, for example, a material having a dielectric constant that changes with an electric field. The nano array layer 50 may include a plurality of nano structures 52, although in the drawings, one nano structure 52 forming one channel is illustrated as an example. An insulating layer 30 may be further disposed between the nano array layer 50 and the active layer 20. A voltage 70 may be applied between the electrode layer 10 and the nano array layer 50.

The nano structure 52 may have a shape dimension of a sub-wavelength. Herein, the sub-wavelength means dimensions smaller than an operation wavelength of the phase modulator 100, i.e., wavelength of the incident light $L_i$ to be modulated. One or more dimensions that form the shape of the nano structure 52, e.g., at least one of a thickness, a width, and a length, may be a sub-wavelength dimension.

The conductive material adopted in the nano structure 52 may include a high-conductivity metallic material in which surface plasmon excitation may occur. For example, at least any one selected from among copper (Cu), aluminum (Al), nickel (Ni), iron (Fe), cobalt (Co), zinc (Zn), titanium (Ti), ruthenium (Ru), rhodium (Rh), palladium (Pd), platinum (Pt), silver (Ag), osmium (Os), iridium (Ir), and gold (Au) may be adopted, or an alloy including any one of these elements may be adopted. A two-dimensional (2D) material having superior conductivity, such as graphene or conductive oxide, may be used.

The active layer 20 may include a material having optical characteristics that change with an external signal. The external signal may be an electric signal. The active layer 20 may include transparent conductive oxide (TCO) such as indium tin oxide (ITO), indium zinc oxide (IZO), aluminum zinc oxide (AZO), gallium zinc oxide (GZO), or the like. Transition metal nitride such as TiN, ZrN, HfN, or TaN may also be used for the active layer 20. Moreover, an electro-optic material having an effective dielectricity that changes with application of an electric signal, e.g., LiNbO3, LiTaO3, potassium tantalate niobate (KTN), lead zirconate titanate (PZT), etc., may be used, and various polymer materials having electro-optic characteristics may be used.

The electrode layer 10 may be formed using various materials having conductivity. The electrode layer 10 may include at least any one selected from among Cu, Al, Ni, Fe, Co, Zn, Ti, Ru, Rh, Pd, Pt, Ag, Os, Ir, and Au. If the electrode layer 10 includes a metallic material, the electrode layer 10 may function as a reflective layer for reflecting light as well as to apply a voltage. The electrode layer 10 may include transparent conductive oxide (TCO) such as ITO, IZO, AZO, GZO, or the like.

The nano structure 52 may modulate a phase of light having a particular wavelength using surface plasmon resonance occurring in a boundary between the metallic material and a dielectric material, and the output phase value is related to a detailed shape of the nano structure 52. The output phase value may be adjusted by a change of the optical properties of the active layer 20 due to a voltage applied between the nano structure 52 and the electrode layer 10.

Referring to FIG. 3, the phase modulator 102 may include an active layer 22, a nano array layer 60 in which a dielectric nano structure 62 is arrayed, and an electrode layer 10 for applying a signal to the active layer 22. The active layer 22 may include a material having optical properties that change with signal application, e.g., a material having a dielectric constant that changes with an electric field. The nano array layer 60 may include a plurality of nano structures 62, although in the drawings, one nano structure 62 forming one channel is illustrated as an example. A conductive layer 40 may be further disposed between the nano array layer 60 and the active layer 22. The voltage 70 may be applied between the electrode layer 10 and the conductive layer 40.

The active layer 22 may include an electro-optic material having a refractive index that changes according to an effective dielectric constant that changes with application of an electric signal. As the electro-optic material, LiNbO3, LiTaO3, KTN, PZT, etc., may be used, and various polymer materials having electro-optic characteristics may also be used.

The electrode layer 10 may be formed using various materials having conductivity. The electrode layer 10 may include at least any one selected from among Cu, Al, Ni, Fe, Co, Zn, Ti, Ru, Rh, Pd, Pt, Ag, Os, Ir, and Au. If the electrode layer 10 includes a metallic material, the electrode layer 10 may function as a reflective layer for reflecting light as well as to apply a voltage. The electrode layer 10 may include transparent conductive oxide (TCO) such as ITO, IZO, AZO, GZO, or the like.

The nano structure 62 may have a shape dimension of a sub-wavelength. The nano structure 62 may include a dielectric material to modulate a phase of light having a particular wavelength by using Mie resonance caused by a displacement current. To this end, the nano structure 62 may include a dielectric material having a refractive index higher than that of the active layer 22, for example, a material having a refractive index higher than the highest value in a range in which the refractive index of the active layer 22 changes by application of a voltage. The phase value output by the nano structure 62 may be related to a detailed structure of the nano structure 62. The output phase value from the nano structure 62 may be adjusted by a change of the optical properties of the active layer 10 due to a voltage applied between the conductive layer 40 and the electrode layer 10.

FIGS. 2 and 3 illustrate exemplary structures in the phase modulators 101 and 102, respectively, and the phase modulator 100 of the phase modulation active device 1000 illustrated in FIG. 1 is not limited to the illustrated structures, and a modified form thereof may be adopted in the phase modulation active device 1000.

To control the phase modulation active device 1000, a phase modulation range implemented by each channel of the phase modulator 100 needs to cover 0° through 360°. However, a phase modulation value may not increase beyond a specific limit even if an input signal is increased, which is referred to as phase limit. The phase limit may have a value less than 360°, for example, 210°, 300°, 330°, etc., and if the phase modulator 100 shows the phase limit, a target phase may not be achieved in a channel needing phase modulation beyond the phase limit and up to 360°, resulting in degraded optical modulation performance.

For example, if the phase modulator 100 implements beam steering, a plurality of channels adjacent to each other show a linearly increasing phase, a phase difference between adjacent channels is Δφ, and a channel width is d, then light having a wavelength λ is steered in a direction at an angle θ from the light's original path, where the angle θ is defined as follows:

$$\sin\theta = \frac{\Delta\phi}{2\pi}\frac{\lambda}{d}$$

However, if the phase value of the channels fails to reach 360° due to the phase limit, a part of the incident light $L_i$ is steered in a direction other than θ. That is, a distribution of the modulated light $L_m$ may exhibit a peak in a position other than a desired angle θ. Then, a peak magnitude at the desired angle θ may be correlatively reduced. Due to this phenomenon, signal-to-noise ratio (SNR) may be lowered and luminance efficiency may also be reduced.

The phase modulation active device 1000 according to the example embodiment may reduce or minimize performance degradation of the phase modulation active device 1000 due to phase limit by adjusting a target phase value for a channel showing phase limit among the plurality of channels CH_1 through CH_N of the phase modulator 100. To this end, the controller 300 may control the signal input unit such that a target phase value for at least a part of a channel showing phase limit among the plurality of channels is less than a phase limit value. The adjusted target phase value may be, for example, a minimum value among phase modulation values that may be implemented by the phase modulator 100 according to an input signal.

Hereinafter, referring to FIGS. 4 through 9, a method of driving a phase modulation active device according to an example embodiment will be described.

Figure 4:
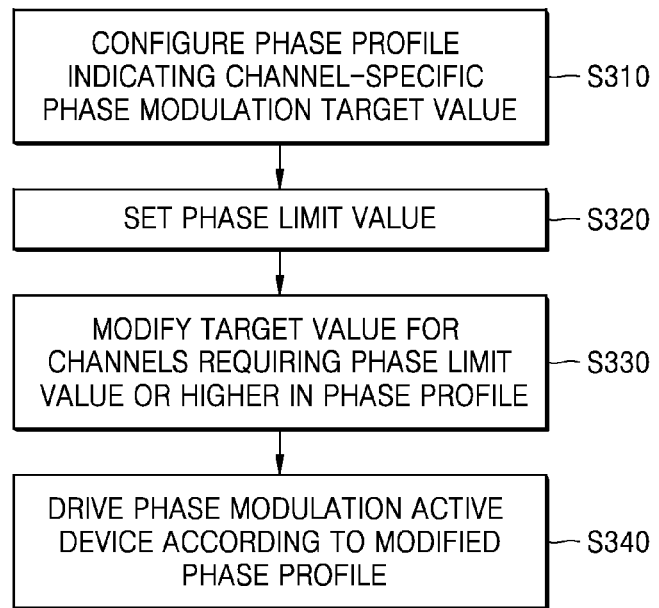
FIG. 4 is a flowchart schematically illustrating a method of driving a phase modulation active device according to an example embodiment.

FIG. 4 is a flowchart schematically illustrating a method of driving a phase modulation active device according to an example embodiment.

Referring to FIG. 4, for the phase modulation active device, a phase profile indicating a channel-specific target phase modulation value (also referred to a phase modulation target value or a target phase value) may be configured in operation S310.

As stated above, optical modulation characteristics of the phase modulation active device may be controlled according to rules of channel-specific phase modulation, such that the phase modulation profile is configured suitably for optical performance to be implemented.

Figure 5:
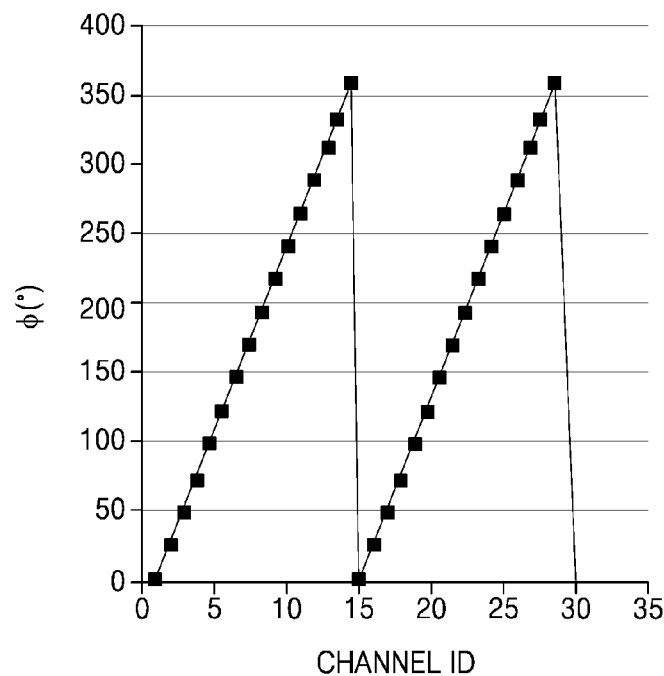
FIG. 5 illustrates a phase profile that sets a phase value of each channel to drive a phase modulation active device as a beam steering device.

FIG. 5 illustrates a phase profile that sets a phase value of each channel to drive (e.g., operate) a phase modulation active device as a beam steering device.

The illustrated phase profile shows an example designed such that light incident to the phase modulation active device 1000 is directed toward a steering angle $\theta_T$ by the phase modulation active device 1000. A horizontal axis of a graph plots a channel ID. In the illustrated phase profile, a phase value is 0° in channel 1, and a phase value of each channel linearly increases up to 360° in a direction toward an adjacent channel, and then goes back to 0° and increases up to 360° again.

Next, a phase limit value $\varphi_{lim}$ of the phase modulation active device 1000 may be set in operation S320. To set the phase limit value $\varphi_{lim}$, the change of a phase modulation value according to the change of an applied voltage may be analyzed. The analysis of the change may be performed with respect to one channel of the phase modulation active device 1000.

Figure 6:
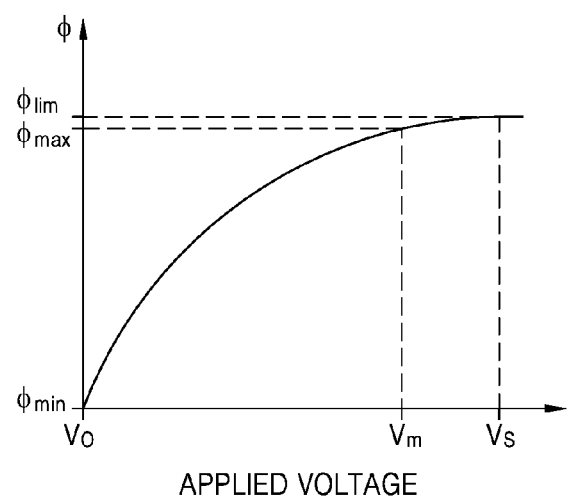
FIG. 6 is a conceptual graph for describing a phase limit.

FIG. 6 is a conceptual graph for describing a phase limit.

By analyzing a tendency of the change of the phase modulation value with respect to the change of the applied voltage (e.g., correlation between the phase modulation value and the applied voltage), an applied voltage-versus-phase graph may be obtained. Referring to the graph, as an applied voltage increases, a phase output value may likewise increase, but may be saturated at the phase limit value $\varphi_{lim}$, and once being saturated, the phase output value may not increase any longer even if the applied voltage increases.

From the graph of FIG. 6, the phase limit value $\varphi_{lim}$ and an applied voltage $V_S$ for reaching the phase limit value $\varphi_{lim}$ may be set, and a minimum value $\varphi_{min}$ and a maximum value $\varphi_{max}$ of phase modulation to be implemented by the phase modulation active device and applied voltages $V_0$ and $V_m$ for the minimum value $\varphi_{min}$ and the maximum value $\varphi_{max}$, respectively, may also be set.

The minimum value $\varphi_{mm}$ may be 0, without being limited thereto.

The maximum value $\varphi_{max}$ may be set to the same value as the phase limit value $\varphi_{lim}$ or to a value less than the phase limit value $\varphi_{lim}$, for example, a specific percentage or ratio (e.g., 90%, 95%) or higher of the phase limit value $\varphi_{lim}$. The graph includes a range in which a gradient of a phase increase with respect to an applied voltage increase is significantly low as a region for implementing a phase very close to the phase limit value $\varphi_{lim}$, and by setting the maximum value $\varphi_{max}$ in the range, an efficient applied voltage may be set. The set maximum value $\varphi_{max}$ and minimum value $\varphi_{min}$ may be used to modify a target phase value in the next operation S330.

Figure 7:
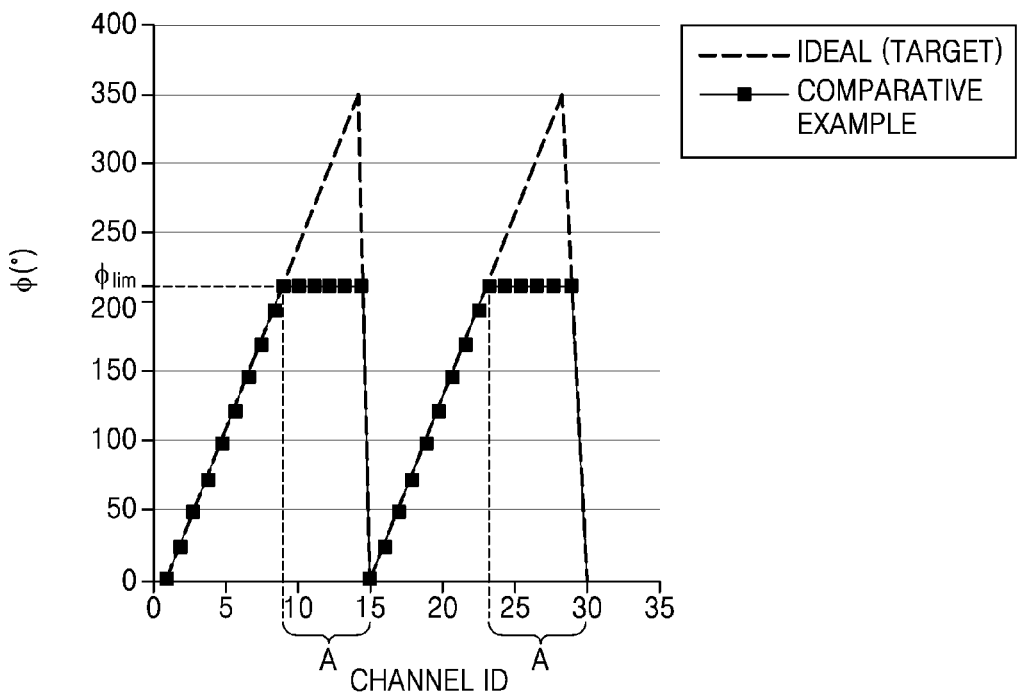
FIG. 7 illustrates a phase profile implemented in a phase modulation active device according to a comparison example.

FIG. 7 illustrates a phase profile implemented in a phase modulation active device according to a comparison example.

The phase profile illustrated in FIG. 7 is implemented in the phase modulation active device with a phase limit when a voltage is applied to each channel of the phase modulation active device to implement the phase profile of FIG. 5. Herein, a comparative example means a case where the driving method according to an example embodiment is not applied.

The graph also shows, with a dotted line, a case where the target phase profile set in FIG. 5 is ideally implemented. In the target phase profile, channels A needing the phase limit value $\varphi_{lim}$ or higher (e.g., channels having phase modulation targets that exceed the phase limit value $\varphi_{lim}$) are referred to as limit channels A. In the limit channels A, a value higher than the phase limit value $\varphi_{lim}$ may not be substantially implemented. That is, the limit channels A may exhibit the phase limit value $\varphi_{lim}$, instead of their target phase values.

In the driving method according to an example embodiment, for the limit channels A, the target phase value may be modified in operation S330, and the phase modulation active device may be driven according to the modified phase profile in operation S340.

The phase of the limit channels A may be reset to a value lower than the target phase values set in the target phase profile. For at least some of the limit channels A, modification to a lower target phase value may be performed, and the modified value may be the minimum value $\varphi_{min}$ that may be implemented by the phase modulation active device.

Figure 8:
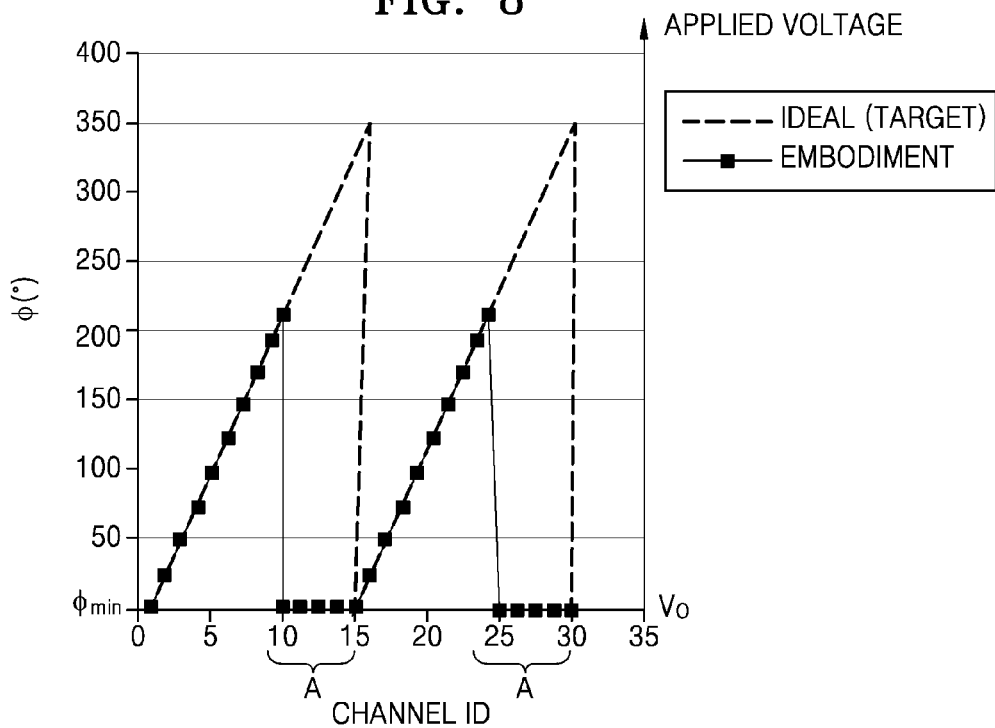
FIG. 8 is a graph showing an example in which a target phase value for limit channels is reset based on a method of driving a phase modulation active device according to an example embodiment.

FIG. 8 is a graph showing an example in which a target phase value for the limit channels A is reset based on a method of driving a phase modulation active device according to an example embodiment.

Referring to FIG. 8, a target phase value for the limit channels A may be modified to the minimum value $\varphi_{min}$ that is set in FIG. 6. In other words, phases of the channels A needing (e.g., ideally targeted for) the phase limit value $\varphi_{lim}$ or higher is reset to the minimum value $\varphi_{min}$. In the graph, the vertical line on the right-hand side indicates an applied voltage, and the applied voltage $V_0$ implementing the minimum value $\varphi_{min}$ may be determined from the graph of FIG. 6.

Although the phase is reset to the minimum value $\varphi_{min}$ for all the limit channels A in FIG. 8, the phases may be set to the minimum value $\varphi_{min}$ for only some of the limit channels A. For example, phases of some of the limit channels A may be reset to the minimum value $\varphi_{min}$, and phases of others may be reset to the maximum value $\varphi_{max}$.

Figure 9:
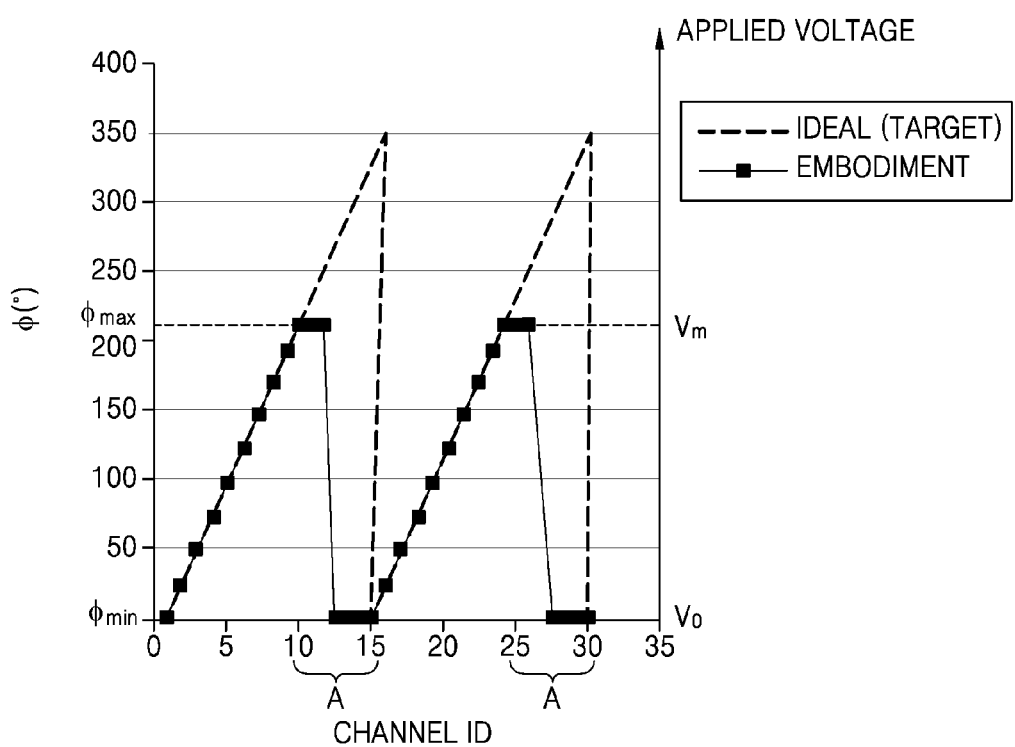
FIG. 9 is a graph showing another example in which a target phase value for limit channels is reset based on a method of driving a phase modulation active device according to an example embodiment.

FIG. 9 is a graph showing another example in which a target phase value for the limit channels A is reset based on a method of driving a phase modulation active device according to an example embodiment.

Referring to FIG. 9, a portion (e.g., one half) of the limit channels A may be reset to the maximum value $\varphi_{max}$, and another portion (e.g., the other half) may be reset to the minimum value $\varphi_{min}$. To drive (e.g., operate) the phase modulation active device in this way, an input signal $V_m$ for implementing the maximum value $\varphi_{max}$ may be applied to one half of the limit channels A, whereas an input signal $V_0$ for implementing $\varphi_{min}$ may be applied to the other half. As shown in FIG. 9, for a half of the limit channels A having a relatively large difference (e.g., a difference of more than a predetermined threshold difference value) between a target phase value and the phase limit value $\varphi_{lim}$ (e.g., when the target phase value is higher than a predetermined threshold phase value), the phase may be reset to the minimum value $\varphi_{min}$, and for the other half having a relative small difference (e.g., a difference of less than the predetermined threshold difference value) between the target phase value and the phase limit value $\varphi_{lim}$ (e.g., when the target phase value is lower than a predetermined threshold phase value), the phase may be reset to the maximum value $\varphi_{max}$. The maximum value $\varphi_{max}$ may be equal to or less than the phase limit $\varphi_{lim}$, as mentioned with reference to FIG. 6.

Figure 10:
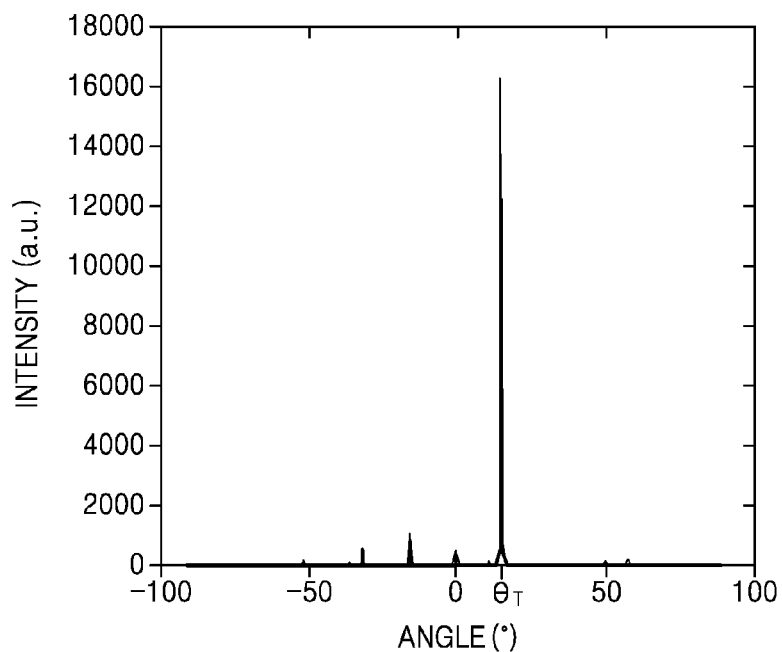
FIG. 10 is a graph showing an intensity distribution with respect to an angle for light modulated by a phase modulation active device according to an example embodiment.

FIG. 10 is a graph showing an intensity distribution with respect to an angle for light modulated by a phase modulation active device according to an example embodiment.

In FIG. 10, the phase modulation active device is driven based on a phase profile according to an example embodiment reset as shown in FIG. 9. Referring to the graph, at a target steering angle $\theta_T$, maximum intensity is shown in arbitrary units (AU), and at some other angular positions, smaller peaks are shown. In the graph, a peak at the intended angle $\theta_T$ is referred to as a main peak, and other peaks are referred to as side lobes.

Figure 11:
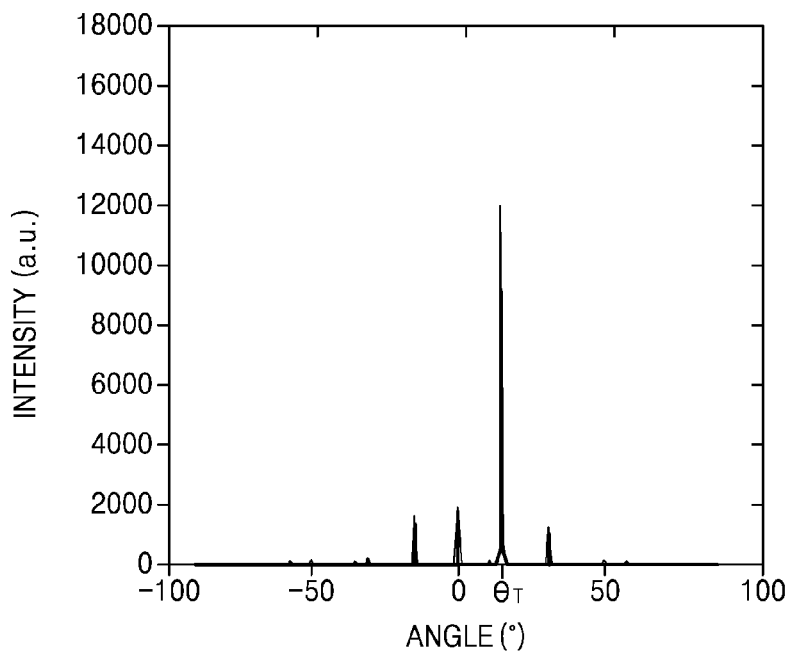
FIG. 11 is a graph showing an intensity distribution with respect to an angle for light modulated by a phase modulation active device according to a comparative example.

FIG. 11 is a graph showing an intensity distribution with respect to an angle for light modulated by a phase modulation active device according to a comparative example.

FIG. 11 illustrates modulated light when the phase modulation active device is driven according to the phase profile corresponding to the comparative example shown in FIG. 7, that is, when the target phase values for the limit channels A are not reset. Also in the graph of FIG. 11, the maximum intensity is shown at the target steering angle $\theta_T$, and a plurality of side lobes may be seen.

In the graphs of FIGS. 10 and 11, the side lobes may be seen because the phase profile as shown in FIG. 5 may not be implemented due to the phase limit. Comparing the graph of FIG. 10 with the graph of FIG. 11, the magnitudes of the side lobes in the graph of FIG. 10 according to the driving method of the example embodiment are smaller than those of the side lobes in the graph of FIG. 11 according the comparative example. The magnitude of the main peak is also higher in FIG. 10 than in FIG. 11. This effect is obtained by resetting the phase value for the limit channels A.

Figure 12:
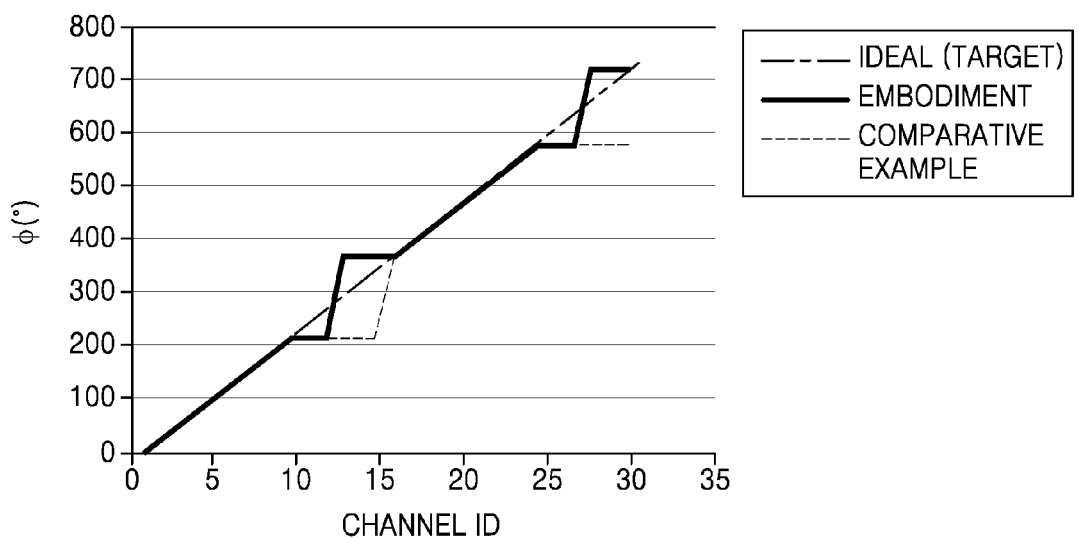
FIG. 12 is a graph for comparing a phase profile of an embodiment and a phase profile of a comparative example with an ideal case to implement beam steering.

When the driving method according to an example embodiment is applied, a higher main peak and lower side lobes are shown than with the comparative example where the driving method according to an example embodiment is not applied, as can be predicted from the graph of FIG. 12.

FIG. 12 is a graph for comparing a phase profile of an example embodiment and a phase profile of a comparative example with an ideal case to implement beam steering.

In the graph, a vertical axis plots target phases to be implemented by respective channels, in an manner by which the phase values wrap around the angle 360°. That is, phases of a series of channels that follow the channels with their phases linearly increasing from 0° to 360° are indicated as ranging from 360° to 720°.

Referring to the graph, the degree to which a given phase value implemented for one of the limit channels A deviates from the target phase value is much lower in the example embodiment than in the comparative example.

Figure 13:
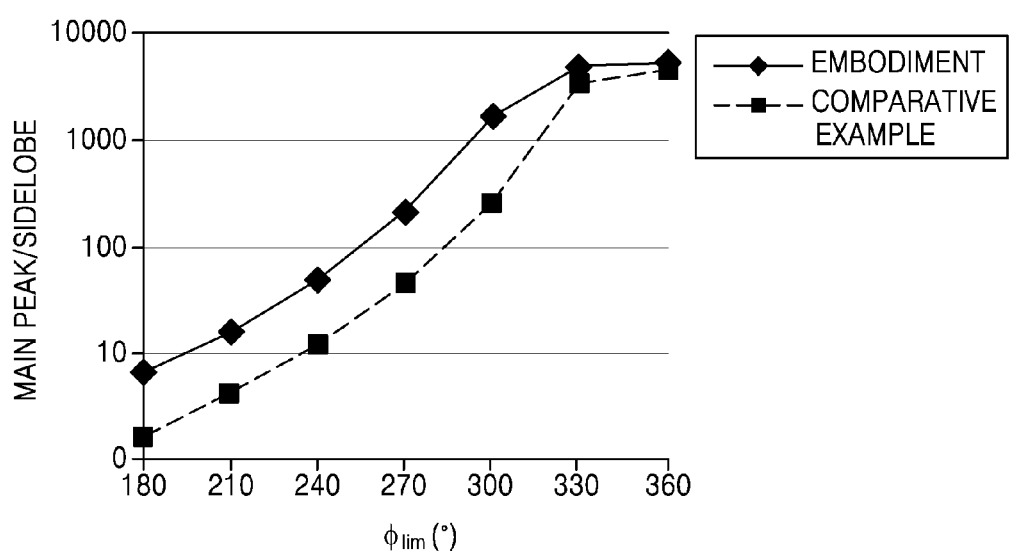
FIG. 13 is a graph showing a ratio of a main peak to a side lobe for light modulated by phase modulation active devices according to an embodiment and a comparative example with respect to a phase limit value.

FIG. 13 is a graph showing a ratio of a main peak to a side lobe for light modulated by phase modulation active devices according to an example embodiment and a comparative example with respect to a phase limit value.

In FIG. 13, a horizontal axis plots a phase limit value $\varphi_{lim}$, and a vertical axis plots a ratio of a magnitude of a main peak relative to a magnitude of a side lobe. As the phase limit value $\varphi_{lim}$ moves toward 360°, a performance difference between the comparative example and the example embodiment becomes smaller. As the phase limit value $\varphi_{lim}$ moves away from 360°, a performance difference between the comparative example and the example embodiment becomes larger. Once the phase limit value $\varphi_{lim}$ is less than about 330°, then the performance difference between the comparative example and the example embodiment becomes significant, resetting phase values for limit channels based on the driving method according to the example embodiment help obtain desired optical performance.

Figure 14:
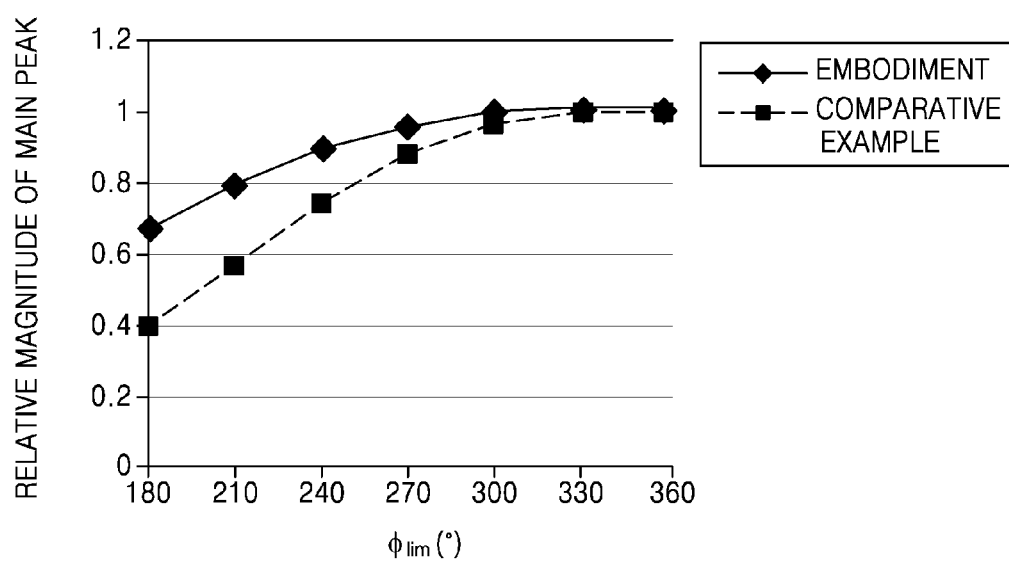
FIG. 14 is a graph showing a relative ratio of a main peak of light modulated by phase modulation active devices according to an embodiment to a comparative example with respect to a phase limit value.

FIG. 14 is a graph showing a relative ratio of a main peak of light modulated by phase modulation active devices according to an example embodiment to a comparative example with respect to a phase limit value.

In FIG. 14, a horizontal axis plots a phase limit value $\varphi_{lim}$, and a vertical axis plots a relative magnitude of a main peak (e.g., relative to a magnitude of a side lobe). As the phase limit value $\varphi_{lim}$ moves away from 360°, a performance difference between the comparative example and the example embodiment becomes larger. As the phase limit value $\varphi_{lim}$ becomes less than 300°, a performance difference between the comparative example and the embodiment becomes significantly larger.

From both the graph of FIG. 13 and the graph of FIG. 14, it can be seen that for all phase limit values $\varphi_{lim}$, the optical performance of the example embodiment is better than that of the comparative example, and in addition, the performance difference therebetween becomes larger as the phase limit value $\varphi$lim becomes smaller. The graph of FIG. 13 may show an SNR-related value, and the graph of FIG. 14 may show a luminance efficiency-related value, and these two factors may be important to optical modulation performance. In this regard, when a channel showing phase limit at about 330° or lower is used for a phase modulation active device, optical modulation performance may be effectively improved by using the driving method according to an example embodiment.

The phase modulation active device 1000 may have various optical capabilities by appropriately setting a phase modulation rule in each channel, thus being applicable to various optical devices.

The phase modulation active device 1000 may be used for a refractive optical lens that may be focused or defocused, and may be applied to various optical systems using such an optical lens. Moreover, with active performance adjustment, the phase modulation active device 1000 may perform a function such as variable focusing.

The phase modulation active device 1000 may be applied as a beam splitter that splits incident light in various directions, as a beam shaper that performs beam shaping, or as a beam steering device that steers light in a desired direction. The phase modulation active device 1000 may be used in various optical systems using a beam splitter, a beam former, a beam steering device, or the like. Moreover, with active performance adjustment, e.g., steering direction adjustment, the phase modulation active device 1000 may perform a function such as beam scanning.

Figure 15:
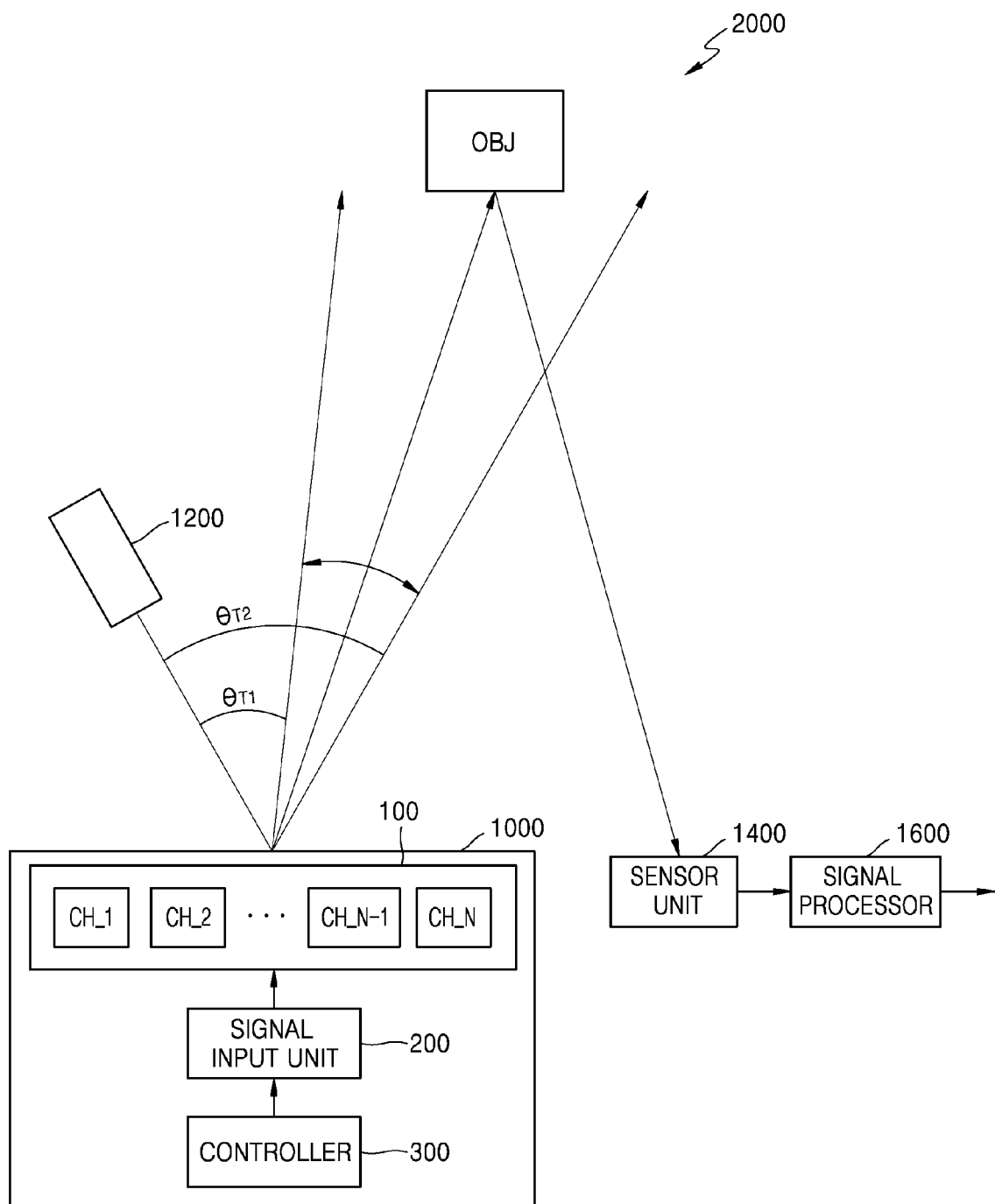
FIG. 15 is a block diagram schematically illustrating a structure of a lidar device according to an example embodiment.

FIG. 15 is a block diagram schematically illustrating a structure of a lidar device 2000 according to an example embodiment.

The lidar device 2000 may include a light source unit 1200 that irradiates light, the phase modulation active device 1000 that steers the light irradiated from the light source unit 120 toward an object OBJ, and a sensor unit 1400 that senses light reflected from the object OBJ.

The light source unit 1200 may irradiate light to be used for the analysis of a location and a shape of the object OBJ. The light source unit 1200 may include a light source that generates and irradiates light having a specific wavelength. The light source unit 1200 may include a light source such as a laser diode (LD), a light emitting diode (LED), a super luminescent diode (SLD), or the like, which generates and irradiates light having a wavelength band suitable for the analysis of the position and the shape of the object OBJ, e.g., light having an infrared wavelength. The light source unit 1200 may generate and irradiate light in a plurality of different wavelength bands. The light source unit 1200 may generate and irradiate pulse light or continuous light.

The phase modulation active device 1000 may include the phase modulator 100 including a plurality of channels for independently modulating a phase of incident light, the signal input unit 200 for applying an input signal for phase modulation to each of the plurality of channels, and the controller 300 for controlling the signal input unit 200. The phase modulator 100 may have the same structure as one or both of the above-described phase modulators 101 and 102.

Between the light source unit 1200 and the phase modulation active device 1000 and/or between the phase modulation active device 1000 and the object OBJ, other optical members, for example, members for adjusting a path of light irradiated from the light source 1200, splitting a wavelength of the irradiated light, or performing additional modulation, may be further disposed.

The controller 300 may set a target phase value for each of the plurality of channels CH_1 through CH_N to cause the phase active modulation device 1000 to perform beam steering, and controls the signal input unit 200 to apply an input signal for this end. The controller 300 may control the signal input unit 200 to apply an input signal for lowering a target phase value for at least some of the plurality of channels, which exhibit a phase limit, as described above in relation to the driving method. The controller 300 may also control the signal input unit 200 to sequentially adjust the steering direction of the phase modulation active device 1000 over a period of time, thereby to scan the object OBJ with sweeping incident light. The steering angle of the phase modulation active device 1000 may cover a range from $\theta_{T1}$ to $\theta_{T2}$, and during scanning in the range, an optical signal sensed by the sensor unit 1400 may be used to analyze the presence, location, and shape of the object OBJ.

The sensor unit 1400 may include an array of a plurality of sensors for optical detection that senses light reflected from the object OBJ. The sensor unit 1400 may also include arrays of sensors capable of sensing light having a plurality of different wavelengths.

The lidar device 2000 may further include a signal processor 1600. The signal processor 1600 may perform a predetermined operation, e.g., an operation for measuring a time of flight, from the optical signal detected by the sensor unit 1400 and performs three-dimensional (3D) shape identification based on the operation. The signal processor 1600 may use various operation methods. For example, according to a direct time measurement method, pulse light is irradiated to the object OBJ, the time of arrival of the light after being reflected from the object OBJ is measured by using a timer, and then calculating a distance is calculated. According to a correlation method, the pulse light is irradiated to the object OBJ and the distance is measured from a brightness of the light reflected from the object OBJ. According to a phase delay measurement method, light of a continuous wave, such as a sine wave is irradiated to the object OBJ, a phase difference of the light reflected from the object OBJ is sensed, and then the phase difference is converted into the distance. The signal processor 1600 may include a memory (e.g., a computer-readable storage medium) in which a program (e.g., instructions) necessary for the operation and other data may be stored. The signal processor 1600 may be implemented with a processor, a CPU, a SoC, an ASIC, etc.

The signal processor 1600 may transmit an operation result, that is, information about the shape and location of the object OBJ, to another unit. For example, the information may be transmitted to a automotive driving controller or an alert system, etc., of a self-driving device (e.g., vehicle) employing the lidar device 2000.

The lidar device 2000 may be used as a sensor for obtaining 3D information about a forward object in real time, thus being applicable to a self-driving device, e.g., a unmanned vehicle, a self-driving vehicle, a robot, a drone, etc.

The lidar device 2000 may also be applied to a vehicle black box (e.g., dashboard camera) or the like as well as the self-driving device, so as to identify forward or rearward obstacles at night or in the dark when objects are difficult to identify with a conventional image sensor alone.

According to the above-described method of driving the phase modulation active device, improved optical modulation is possible by modifying a target phase value for channels that exhibit a phase limit.

The above-described phase modulation active device may reduce or minimize performance degradation caused by a phase limit even when it is necessary to include channels that exhibit a phase limit to improve optical modulation performance.

The phase modulation active device also has good optical modulation performance that is actively controlled according to an applied voltage, thus being applicable to various optical devices.

So far, example embodiments have been described and illustrated in the attached drawings to help understanding of the present disclosure. However, it should be understood that these example embodiments are intended to merely describe the present disclosure and do not limit the present disclosure. It also should be understood that the present disclosure is not limited to the illustrated and provided description. Therefore, various modifications may be made by those of ordinary skill in the art.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A method of driving a phase modulation active device, the method comprising:
   configuring, for the phase modulation active device comprising a plurality of channels that modulate a phase of incident light, a phase profile indicating a phase modulation target value to be implemented by the phase modulation active device;
   setting a phase limit value of the phase modulation active device, the phase limit value being a value at which a phase change is saturated;
   generating a modified phase profile based on the phase profile by modifying the phase modulation target value, for at least one channel from the plurality of channels that meets or exceeds the phase limit value, to a modified phase modulation target value that is less than the phase limit value in the phase profile; and
   driving the phase modulation active device based on the modified phase profile.

2. The method of claim 1, wherein the setting the phase limit value comprises:
   obtaining a correlation between a phase modulation value of one of the plurality of channels and a voltage applied to the phase modulation active device; and
   based on the correlation, setting the phase limit value.

3. The method of claim 2, wherein the setting the phase limit value further comprises:
setting a minimum value and a maximum value of phase modulation to be implemented by the phase modulation active device based on the correlation.

4. The method of claim 3, wherein the maximum value is less than or equal to the phase limit value and is greater than 90% of the phase limit value.

5. The method of claim 3, wherein the modifying the phase modulation target value comprises:
modifying the phase modulation target value, for the at least one channel of the plurality of channels that meets or exceeds the phase limit value, to the minimum value.

6. The method of claim 3, wherein the modifying the phase modulation target value comprises:
modifying a first phase modulation target value, for a first portion of channels from the plurality of channels that meet or exceed the phase limit value, to the maximum value, and modifying a second phase modulation target value, for a second portion of the channels from the plurality of channels that meet or exceed the phase limit value, to the minimum value.

7. The method of claim 6, wherein the second phase modulation target value for the second portion of channels is set to the minimum value when the second phase modulation target value is higher than a predetermined threshold value.

8. The method of claim 3, wherein the setting the phase limit value further comprises:
setting voltage values V0 and Vm to be applied to the phase modulation active device, the voltage values V0 and Vm corresponding to the minimum value and the maximum value, respectively.

9. The method of claim 8, wherein the driving the phase modulation active device comprises:
applying the voltage value Vm to a first portion of channels from the plurality of channels that meet or exceed the phase limit value, and applying the voltage value V0 to a second portion of the channels that meet or exceed the phase limit value.

10. A phase modulation active device comprising:
a phase modulator comprising a plurality of channels, each channel of the plurality of channels configured to modulate a phase of incident light independently from other channels of the plurality of channels;
a signal input unit configured to apply a first input signal for phase modulation to the each channel of the plurality of channels; and
a controller configured to control the signal input unit to apply the first input signal, which implements a phase modulation value less than a target phase modulation value of a channel, to at least one channel among the plurality of channels that meets or exceeds a phase limit at which a phase change is saturated.

11. The phase modulation active device of claim 10, wherein the phase modulation value less than the target phase modulation value is a minimum value among phase modulation values that are implemented by the phase modulator based on the first input signal.

12. The phase modulation active device of claim 11, wherein a phase limit value at which the phase limit is exhibited is less than 330°.

13. The phase modulation active device of claim 11, wherein a second input signal, which implements a maximum value among the phase modulation values that are implemented by the phase modulator based on the second input signal, is applied to at least one other channel among the plurality of channels that meets or exceeds the phase limit.

14. The phase modulation active device of claim 13, wherein the second input signal that implements the maximum value is applied to a first portion of channels that exhibit the phase limit, and the first input signal that implements the minimum value is applied to a second portion of the channels that meets or exceeds the phase limit.

15. The phase modulation active device of claim 14, wherein the first input signal is applied to the second portion of the channels having target phase values that exceed a predetermined threshold value.

16. The phase modulation active device of claim 14, wherein the phase modulator is configured to modulate the phase of the incident light according to an applied voltage, and from among the channels that exhibit the phase limit, a first voltage value implementing the minimum value is applied to the second portion of the channels having target phase values exceeding a predetermined threshold value, and a second voltage value implementing the maximum value is applied to the first portion of the channels.

17. The phase modulation active device of claim 10, wherein the phase modulator comprises:
an active layer having optical characteristics that change with an electric signal;
a nano array layer comprising a plurality of nano structures arranged over the active layer; and
an electrode layer configured to apply a signal to the active layer.

18. The phase modulation active device of claim 17, wherein each nano structure of the plurality of nano structures has a shape dimension that is smaller than a wavelength of the incident light.

19. The phase modulation active device of claim 17, wherein each nano structure of the plurality of nano structures comprises a metallic material.

20. The phase modulation active device of claim 19, wherein the phase modulator further comprises an insulating layer disposed between the nano array layer and the active layer.

21. The phase modulation active device of claim 17, wherein the signal input unit is configured to apply a voltage between each nano structure of the plurality of nano structures and the electrode layer.

22. The phase modulation active device of claim 17, wherein each nano structure of the plurality of nano structures comprises a dielectric material.

23. The phase modulation active device of claim 22, wherein the phase modulator further comprises a conductive layer disposed between the nano array layer and the active layer,
wherein the signal input unit is further configured to apply a voltage between the conductive layer and the electrode layer.

24. The phase modulation active device of claim 10, wherein the signal input unit is further configured to cause the phase modulator to perform at least one of beam steering, focusing, defocusing, beam shaping, or beam splitting.

25. An optical device comprising the phase modulation active device of claim 10.

26. A lidar device comprising:
a light source unit;
a phase modulation active device configured to steer light from the light source unit toward an object, the phase modulation active device comprising:

a phase modulator comprising a plurality of channels, each channel of the plurality of channels configured to modulate a phase of incident light independently from other channels of the plurality of channels, a signal input unit configured to apply an input signal for phase modulation to the each channel of the plurality of channels, and a controller configured to control the signal input unit to apply the input signal, which implements a phase modulation value less than a target phase modulation value of a channel, to at least one channel among the plurality of channels that meets or exceeds a phase limit value that is a value at which a phase change is saturated; and a sensor unit configured to receive the light that is steered by the phase modulation active device, irradiated to the object, and reflected from the object.

27. The lidar device of claim 26, wherein the controller is further configured to control the signal input unit to sequentially adjust a steering direction of the phase modulation active device to scan the object.

28. A phase modulation active device comprising:

a phase modulator comprising a plurality of channels, each channel of the plurality of channels being configured to modulate incident light according to a phase modulation target value;

a signal input unit configured to apply an electric signal to the plurality of channels; and a controller configured to control the signal input unit to adjust the electric signal such that, in response to a channel from the plurality of channels having the phase modulation target value exceeding a phase limit value that is a value at which a phase change is saturated, the phase modulation target value for the channel is reset to a modified phase modulation target value that is less than the phase limit.

* * * * *